Patented Mar. 7, 1950

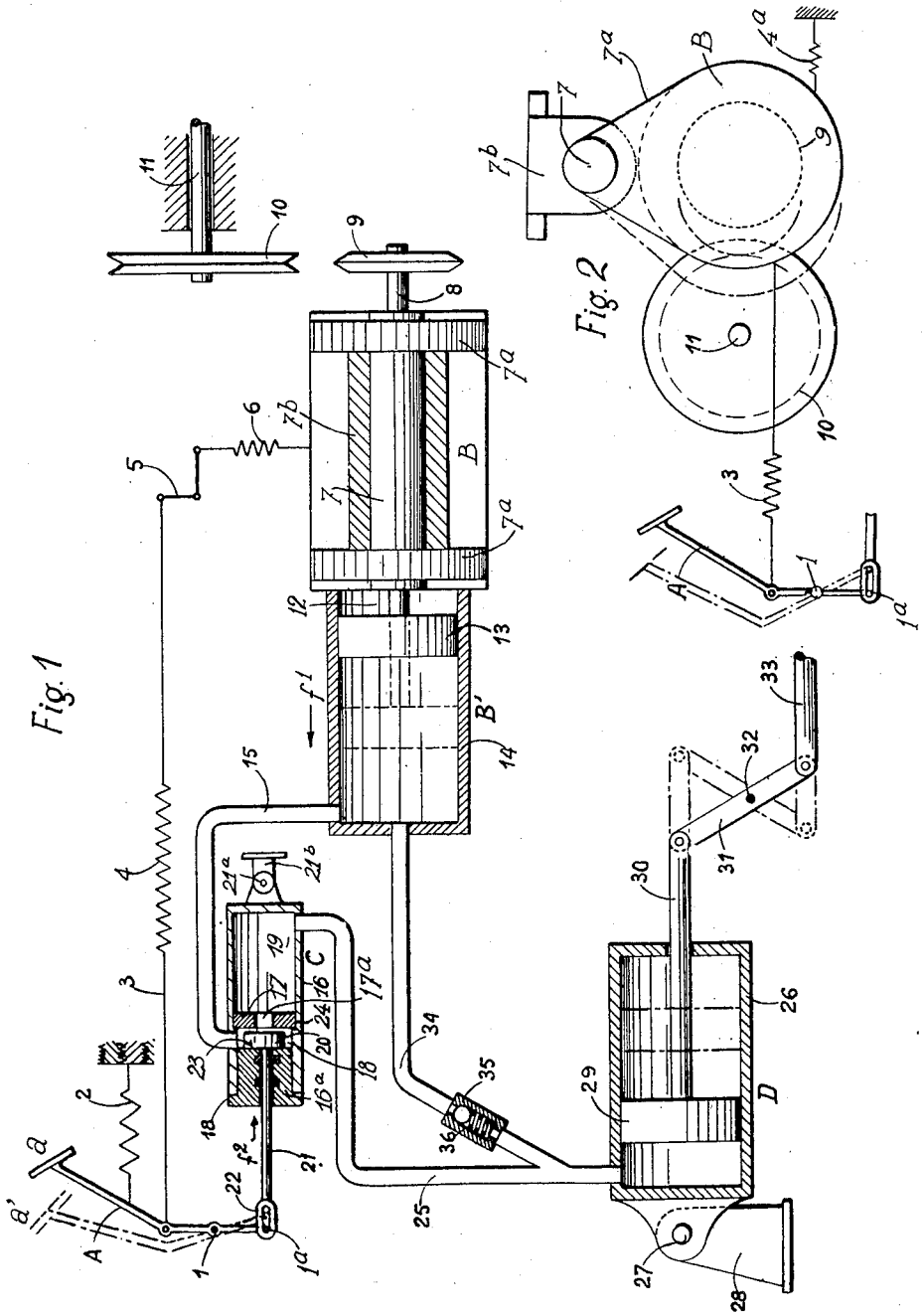

2,499,775

UNITED STATES PATENT OFFICE 2,499,775

SERVO CONTROL DEVICE FOR BRAKES AND THE LIKE

Gérard Pierre Piganeau, Paris, France

Application July 14, 1948, Serial No. 38,637
In France July 19, 1947

6 Claims. (Cl. 60—54.5)

The present invention has for its object to provide an improved device of great flexibility of operation and absolute reliability, for controlling any mechanism, in particular a braking mechanism, having at least one element adapted to effect a comparatively long preliminary stroke requiring a small force, and a comparatively short useful stroke requiring a much larger force.

Said device comprises in combination: an operating member which can be moved at will, a servo-device connected to said operating member by connecting means such that said servo-device is rendered operative by a preliminary stroke of said member which can continue its stroke, a pressure generator controlled by said servo-device, a receiving motor connected to the element to be controlled, and an amplifying and distributing device connected to said generator and to said motor, connected with play to said operating member and so arranged that, during a first portion of the stroke of said operating member which is slightly longer than the aforesaid preliminary stroke thereof, said distributing device places the generator in communication with the motor in order to produce the preliminary stroke of the controlled element, whereas during the second portion of the stroke of said operating member it severs the communication between the generator and the motor and itself performs the function of an amplifying motor, the action of which is controlled by that of the operating member and produces the useful stroke of the controlled member.

Other features and advantages of the invention will become apparent from the ensuing description.

In the accompanying drawing, which is given solely by way of example:

Fig. 1 shows diagrammatically an improved device according to the invention;

Fig. 2 is a diagrammatic end elevation showing the device for starting the servo-motor by means of the operating member.

According to the embodiment shown by way of example, the device comprises an operating member formed for example by a pedal A oscillatably mounted about a shaft 1 and subjected to the action of a resilient retracting device 2, said pedal being provided at its end with a pin 1ª. Said pedal A is connected, by means of a rod system comprising for example a rod 3 with a resilient device 4, a bell-crank lever 5, and a second resilient device 6, to the body of a servo-device B. Said servo-device is oscillatably mounted, like a pendulum, by means of cheeks 7ª and a shaft 7 in a bearing 7ᵇ. Said servo-device may for example be of the known type which operates by means of weights which have slanting faces in mutual contact and act by the effect of the centrifugal force and which has been disclosed for instance in the U. S. Patents 2,069,680 and 2,087,579 of applicant. The drive of the weights is effected by engaging the shaft 8 of said servo-device with a driving member, for example by placing a roller 9 supported by said shaft in contact with a driving pulley 10, the engagement being effected by swinging the whole servo-device about the shaft 7. A resilient device 4ª retains the servo-device B in the disengaged position when inoperative.

The shaft 11 of the pulley 10 can be rotated by the mechanism, a vehicle for example, which the device is adapted to control by acting for example on its brakes or in any other manner.

The weights of servo-device B act, when said device is engaged, in the known manner, on a push-rod 12 which is thus moved in the direction of the arrow $f_1$.

Said push-rod is connected to the piston 13 of a pressure generator B' which is formed by the combination of said piston 13 with a cylinder 14 in which it is adapted to move and which is rigidly fixed at the end of the servo-device B.

The cylinder 14 is connected, through a pipe 15, which is at least partly flexible, to one of the ends of the cylinder 16 of an amplifying distributor C.

This device comprises, inside the cylinder 16, a movable piston 17 which is provided with a hole 17ª enabling the two chambers 18 and 19 which it forms in said cylinder to be placed in communication with one another. Over the opening 17ª of said piston can be pressed a closure valve 20, secured to a rod 21 adapted to slide fluid-tightly in one of the ends 16ª of the cylinder 16. Said rod is terminated by an elongated hole 22 (or any other equivalent device) which enables it to be connected with play to the pedal A, the pin 1ª supported by the end of said pedal being engaged in said elongated hole. This connection is such that said pedal only actuates the rod 21 in the direction of the arrow $f_2$ after a preliminary stroke $aa'$. Abutments 23 and 24 are provided in the cylinder 16, the abutment 23 being formed for example by the inner face of the end 16ª. Against said abutments the valve 20 and the piston 17 are respectively adapted to bear when the device is inoperative and said abutments are so arranged that the valve 20 is then spaced apart from the piston 17 (position shown).

The opposite end of the cylinder to the rod 21 is pivotally connected at 21ª to a stationary support 21ᵇ which forms a fulcrum.

This end of the cylinder 16 is also permanently connected through a pipe 25 to the cylinder 26 of a wheel motor D forming a receiving device. Said cylinder 26 is fixed, for example by a pivotal conenction 27, to a stationary support 28. In said cylinder is adapted to move a piston 29, the rod 30 of which is connected for example to a lever 31 which is oscillatably mounted about a stationary pin 32 and is connected by a rod system 33 to the member or members to be controlled, for example to the usual cam or cams actuating the jaws or shoes of a braking device or devices.

The device is completed by a pipe 34 directly connecting the cylinder 26 of the wheel motor D to the cylinder 14 of the pressure generator B'. On said pipe is provided a stop-valve 35 with a spring 36, said stop-valve opening in the direction: generator B', wheel motor D.

The sizes of the cylinders 14 and 26 of the generator B' and the wheel motor D are about the same, whereas those of the distributor C are substantially smaller.

The device operates as follows:

When the pedal A is depressed during the preliminary stroke which moves said pedal from the position $a$ to the position $a'$, the pin 1ª moves in the elongated hole 22 in such a manner that the rod 21 of the valve 20 is not actuated. On the other hand, during said preliminary stroke, the servo-device B rocks about the shaft 7 (Fig. 2) and is engaged by the roller 9 which has come into contact with the pulley 10. It is therefore rotated and acts on the piston of the generator B' which forces fluid through the pipe 15, the hole 17ª of the piston 17 and the pipe 25 into the receiving wheel-motor D, the discharge through said valve being moreover increased by the discharge through the valve 35 supplied by the pipe 34 in parallel. The wheel-motor D thus receives oil or other liquid at a certain pressure $p_1$ which is sufficient to overcome the action of the usual retracting device or devices of the controlled member or members (retracting springs of the jaws of a brake for example) and already produce a certain braking effect.

The piston of the generator B', the piston of the wheel Motor D and the brake-gear assume their positions shown in dot-and-dash lines, said positions corresponding to the end of the preliminary inoperative stroke of the controlled element or elements, for example to bringing the braking member into contact with the members to be braked.

At the end of this first phase, the pin 1ª, which has been shifted by the movement of the pedal, reaches the end of its travel in the elongated hole 22 and begins to move the rod 21 towards the right; the valve 20 of the distributor consequently soon closes the hole of the piston 17. Owing to the two valves 20, 35, the quantity of oil or driving fluid confined in the circuit towards the receiving wheel motor cannot flow back towards the generator B', and the controlled member or members cannot return backwards.

It is at this point that during a second phase, the amplifying or additional pressure introduced by the distributor device C becomes operative, since if the pedal A is further depressed, which is possible despite the abutment of the servo-device against its driving device owing to the springs 4 and 6, the valve 20 and the perforated piston 17 being in contact with one another and forming a combination that operates as an ordinary fluid-tight piston. The thrust imparted to the pedal is therefore transmitted by fluid pressure to the receiving wheel motor D and then to the rod system, thereby producing the final phase of the operation, with a force equal to $m \times n \times f$.

$f$ being the force exerted on the pedal, $m$ the ratio between the transverse section of the cylinders 14 and 26 and the transverse section of the cylinder 16 of the device C, and $n$ the ratio between the two lever arms of the pedal A, on either side of the fulcrum 1.

By way of example, if the cross-section of the cylinders 14 and 26 is ten times the cross-section of the cylinder 16, $m = 10$, and with a ratio $n$ of the lever arms of the pedal A of the same value, an amplication of 100 is obtained, which, with a very small force of 1 kg. on the pedal A enables a force of 100 kg. to be obtained in the wheel motor D.

It should be noted that since the initial compression of the fluid requires a certain time owing to the inertia of the centrifugal servo-device, and as the thrust on the pedal depends on the human factor, it may happen that owing to too sudden an actuation of said pedal, the valve 20 presses against the piston before the pump has built up a suitable initial pressure and supplied the wheel motor D with the quantity of fluid corresponding to the preliminary stroke.

This delay is not a disadvantage, since through the by-pass 34, the wheel motor D can continue to be supplied with fluid after the valve 20 of the distributor has closed.

When the pedal A is released, the same is returned by the action of its resilient retracting device 2 and the release of the brakes or other return operation of the controlled member or members is effected in two phases like the forward operation.

Until the piston 17 encounters the abutment 23, the valve 20 and the piston 17 move simultaneously and the pressure drops in the wheel motor D to the pressure $p_1$ which produces a return stroke of the controlled member or member which is equal to the useful stroke, i.e., to the release of the brake in the case of a brake, and then the valve 20 leaves the piston 17 and at that instant the pressure in the whole arangement is the pressure determined by the servo-device B.

At the end of the return stroke of the pedal, the servo-device itself is disengaged from the rotating member 11 by the action of the resilient device 4ª, thereby eliminating the oil pressure in the circuit and enabling the piston 29 to return to the inoperative position, i.e., enabling the controlled members to effect a movement equal to the preliminary stroke.

As can be seen, the device described is of very great flexibility of operation, since the braking or other force exerted on the rod system 33 is proportional to the movements of the pedal or other operating member A and can be adjusted at will by a step by step movement of said member.

Furthermore, it is almost absolutely reliable since: on the one hand too quick an action on the pedal A does not prevent the filling of the wheel motor D by the servo-device owing to the by-pass 34 short-circuiting the amplifying and distributing device C, and on the other hand even after the shaft of the servo-device has slowed down, in the case in particular in which said servo-device is driven by a vehicle which is braked by means of the device, the braking can be maintained until the complete stoppage of the vehicle by the pedal by means of the amplifying and distributing device.

Naturally, the invention is in no way limited to the embodiment illustrated and described which has only been chosen by way of example.

Having now described my invention what I claim as new and desire to secure by Letters Patent is:

1. A device for controlling at least one movable element, which has to be given a long preliminary stroke that only requires a small force and then a shorter useful stroke which requires a much greater force, said device comprising in combination: a servo-device, a device for driving said servo-device, clutch means between said driving device and said servo-device, a movable operating member which can be moved at will, resilient connecting means between said operating member and said servo-device for moving said servo-device to clutch with said driving device by means of a preliminary stroke of said member which can continue its stroke, a pressure generator controlled by said servo-device, a receiving motor connected to said element to be controlled, a distributing and amplifying device which comprises a cylinder, a piston provided with a hole and adapted to move in said cylinder and a valve adapted to move also in said cylinder and to close said hole, pipes for connecting the opposite ends of said cylinder respectively to said motor and said generator, and means for connecting with play said valve to said operating member in such a manner that, during a first portion of the stroke of said operating member, which is slightly longer than the aforesaid preliminary stroke thereof, the distributing device places the generator in communication with the motor through said hole in order to produce the preliminary stroke of the controlled element, whereas during the second portion of the stroke of said operating member the valve severs the connection between the generator and the motor, the distributing device performing itself the function of an amplifying motor controlled by the operating member and producing the useful stroke of the controlled element.

2. Control device according to claim 1, wherein a by-pass provided with a stop valve directly connects the generator to the receiver, short-circuiting said distributing and amplifying device.

3. Control device according to claim 1, wherein said generator, and receiving motor each comprise a cylinder and a piston adapted to move in said cylinder, the transverse sections of the cylinders of the generator and of the motor being of approximately the same size, whereas the transverse section of said cylinder of the distributing and amplifying device is smaller.

4. Control device according to claim 1, wherein said cylinder of the distributing and amplifying device is formed of two chambers of different diameters, the walls of which form between them an abutment, the smaller diameter chamber being directly connected to the generator and the larger diameter chamber to the motor, said piston provided with a hole being adapted to move in the large diameter chamber while said valve is adapted to move in the small diameter chamber and to close said hole in the piston, a rod being adapted to slide in the end of the cylinder located towards the small diameter chamber and to bear against said valve and having at the end thereof which is outside the cylinder an elongated hole in which is engaged with a longitudinal clearance a pin supported by said movable operating member.

5. Control device according to claim 4, wherein the movable operating member comprises a pedal oscillatably mounted about a stationary shaft at an intermediate point of its length such that the two lever arms formed are unequal, the end of the shortest lever arm being provided with a pin which is engaged in said elongated hole, and said resilient connecting means connecting an intermediate point of said pedal, separated from the fulcrum, to said clutch means for said servo-device.

6. Control device according to claim 1, comprising a servo-device and a pressure generator forming a unit which is suspended like a pendulum, a driven clutch member mounted at the end of the shaft of the servo-device, a rotary driven clutch member with which said driven member can be brought into contact by rocking said suspended unit in one direction, resilient connecting means between said suspended unit and said operating member, for rocking said suspended unit in said direction, and resilient retracting means for rocking said suspended unit in the opposite direction and causing it to disengage.

GÉRARD PIERRE PIGANEAU.

REFERENCES CITED

The following references are of record in the file of this patent:

UNITED STATES PATENTS

| Number | Name | Date |
|---|---|---|
| 2,058,063 | Cox | Oct. 20, 1936 |
| 2,075,176 | Clarke | Mar. 30, 1937 |
| 2,252,482 | Gates | Aug. 12, 1941 |